United States Patent
Neubecker et al.

(10) Patent No.: US 11,380,111 B2
(45) Date of Patent: Jul. 5, 2022

(54) IMAGE COLORIZATION FOR VEHICULAR CAMERA IMAGES

(71) Applicant: FORD GLOBAL TECHNOLOGIES, LLC, Dearborn, MI (US)

(72) Inventors: Cynthia M. Neubecker, Westland, MI (US); Jon M. Speigle, Livonia, MI (US); Lidia Van Moen, Warren, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 108 days.

(21) Appl. No.: 17/035,877

(22) Filed: Sep. 29, 2020

(65) Prior Publication Data
US 2022/0101021 A1 Mar. 31, 2022

(51) Int. Cl.
| | |
|---|---|
| G06T 7/90 | (2017.01) |
| G06V 20/56 | (2022.01) |
| B60R 1/00 | (2022.01) |
| G06T 7/593 | (2017.01) |
| G06T 7/80 | (2017.01) |
| G06V 20/58 | (2022.01) |

(52) U.S. Cl.
CPC .............. *G06V 20/588* (2022.01); *B60R 1/00* (2013.01); *G06T 7/593* (2017.01); *G06T 7/80* (2017.01); *G06T 7/90* (2017.01); *G06V 20/58* (2022.01); *G06T 2207/10024* (2013.01); *G06T 2207/30252* (2013.01)

(58) Field of Classification Search
CPC ........ G06V 20/588; G06V 20/58; B60R 1/00; G06T 7/593; G06T 7/80; G06T 7/90; G06T 2207/10024; G06T 2207/30252
USPC ......................................................... 382/154
See application file for complete search history.

(56) References Cited

U.S. PATENT DOCUMENTS

| | | | |
|---|---|---|---|
| 5,340,977 A * | 8/1994 | Kojima ................ | H04N 5/3692 |
| | | | 257/241 |
| 8,384,954 B2 | 2/2013 | Honma | |
| 9,124,778 B1 * | 9/2015 | Crabtree .................. | H04N 7/18 |
| 9,449,227 B2 | 9/2016 | Chen et al. | |
| 9,497,380 B1 * | 11/2016 | Jannard .............. | H04N 5/23238 |

(Continued)

OTHER PUBLICATIONS

Yibo Zhang, Yichen Wu, Yun Zhang & Aydogan Ozcan, Color calibration and fusion of lens-free and mobile-phone microscopy images for high-resolution and accurate color production, Scientific Reports|6:27811|DOI: 10.1038/srep27811, Jun. 10, 2016.

(Continued)

*Primary Examiner* — Ali Bayat
(74) *Attorney, Agent, or Firm* — Frank L. Lollo; MacMillan, Sobanski & Todd, LLC

(57) ABSTRACT

Apparatus for a motor vehicle comprises an image sensor generating non-trichromatic image data as an image pixel array covering a predetermined field of view relative to the vehicle. A color-calibration source generates at least one color reference value according to an object depicted in the non-trichromatic image data. A controller is configured to 1) associate the at least one color reference value to a set of pixels within the image pixel array, and 2) colorize the non-trichromatic image data according to the at least one color reference value to produce a colorized image. A display is configured to display the colorized image to a viewer in the vehicle.

20 Claims, 5 Drawing Sheets

(56) References Cited

U.S. PATENT DOCUMENTS

| | | | |
|---|---|---|---|
| 9,904,867 | B2 | 2/2018 | Fathi et al. |
| 10,110,880 | B2 | 10/2018 | Cooper |
| 10,140,690 | B2 | 11/2018 | Chakraborty et al. |
| 2014/0036229 | A1* | 2/2014 | Hsu .................. A61B 3/12 351/246 |
| 2020/0342623 | A1* | 10/2020 | Cull .................. G06V 20/58 |
| 2022/0041105 | A1* | 2/2022 | Jochmann ........... G06V 20/56 |

OTHER PUBLICATIONS

Muxingzi Li, Peihan Tu, Wolfgang Heidrich, Robust Joint Image Reconstruction from Color and Monochrome Cameras, 2019.

Hae-Gon Jeon, et al, Stereo Matching with Color and Monochrome Cameras in Low-light Conditions, 2016 IEEE Conference on Computer Vision and Pattern Recognition.

Aaron Hertzmann et al., Image Analogies, SIGGRAPH, 2001.

Anat Levin et al., Colorization Using Optimization, ACM Transaction on Graphics, 23(3):689-694, 2004.

A. Buades et al. A Review of Image Denoising Algorithms, With a New One, Multiscale Model, Simul. vol. 4, No. 2, pp. 490-530, 2005.

Rob Fergus, Course on Computational Photography—CSCI-GA. 3033-012, Lecture 5—Denoising & Bilateral Filtering, 2013.

Huiwen Chang et al., Palette-based Photo Recoloring, TOG, 2015.

Jonathon T. Barron et al., The Fast Bilateral Solver, arXiv:1511.03296v2, ECCV, Jul. 22, 2016.

Satoshi Iizuka et al., Let there be Color!: Joint End-to-end Learning of Global and Local Image Priors for Automatic Image Colorization with Simultaneous Classification, SIGGRAPH, 2016.

Gustav Larsson et al., Learning Representations for Automatic Colorization, arXiv:1603.06668v3, Aug. 13, 2017.

Richard Zhang et al., Colorful Image Colorization, arXiv:1603.08511v5, Oct. 5, 2016.

Richard Zhang et al., Real-Time User-Guide Image Colorization with Learned Deep Priors, arXiv:1705.02999v1, SIGGRAPH, May 8, 2017.

* cited by examiner

IMAGE COLORIZATION FOR VEHICULAR CAMERA IMAGES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to imaging systems for motor vehicles, and, more specifically, to improving image quality by fusing sources of imaging data in order to colorize non-trichromatic images obtained by non-trichromatic image sensors which may have a higher resolution.

Motor vehicles (e.g., passenger vehicles such as cars and trucks using a combustion engine, electric powertrain, or both) typically have multiple image sensors (i.e., cameras) installed throughout the vehicle using a variety of imaging technologies. The use of multiple cameras/image sensors has improved the detection of objects and the situational awareness of the area immediately around the vehicle. Some cameras are deployed to capture images to be presented visually to the driver on a display, such as a backup camera providing a live view of the area behind the vehicle when the vehicle transmission is shifted into reverse. Other cameras capture images not normally intended for viewing by the human driver at all, but instead provide image data used by advanced driver assistance systems (ADAS) and/or autonomous driving controllers. The nonhuman systems may typically employ computer vision technology to detect objects and/or the vehicle surroundings for maintaining a proper driving path and avoiding any detecting obstacles, for example.

Cameras with non-trichromatic color filter arrays (CFAs) have proven to be beneficial for computer vision performance. As used herein, non-trichromatic refers to monochromatic or bi-chromatic image sensors in which pixels in the image data do not differentiate between colors that are distinguishable to the CIE 1931 standard observer. Examples of non-trichromatic CFAs include grayscale or RCCC image sensors where a primary emphasis is placed on low-light sensitivity at the expense of obtaining human-viewable color accuracy. In particular, non-trichromatic image sensor values cannot be accurately transformed to the XYZ color space as defined by the International Commission on Illumination (CIE). Another example includes an IR or near-IR image sensor which may be monochromatic and which may not correspond with CIE luminance, trichromacy, or human visible wavelength range.

Edges (i.e., borders) are the main image features important for detecting objects within an image, and since color information (hue, chroma or saturation) is often not necessary for finding the edges, the capturing of images at a higher resolution but without full color information is better suited for use in computer vision. For human viewing, on the other hand, color images are much preferred in order to provide a natural image and to enable colors in the image to provide cues for human perception and for quick recognition of elements in the scene. These competing requirements for image collection may lead to a large number of cameras being deployed on a single vehicle.

It would be preferable to optimize the use of the image sensing technologies in order to minimize packaging, parts costs, and parts count while supporting a wide range of features including human vision and computer vision applications.

SUMMARY OF THE INVENTION

The invention combines information across sensor classes to create a richer video stream such as one utilizing color information from a color sensor to enhance a monochromatic or non-trichromatic image sensor. In some embodiments, an automotive-grade, tri-colored (e.g., Red-Blue-Green) CFA camera sends color data (e.g., a colored reference image) to a controller or other processor for performing an image colorization algorithm to correct the colorization of non-RGB images from a non-trichromatic camera (which may have higher resolution or a different field of view, for example). The image colorization processing itself may incorporate many well-known procedures and algorithms of the type used for old black and white photographs or movies. In addition, the processing may use one or more on-vehicle cameras providing color reference points in order to constrain the colorization problem and produce accurate colorizations for at least some objects within the non-trichromatic image. As used herein, "object" refers to a region in the camera field of view having a discernible border (i.e., peripheral edge) and having a particular color appearance within that border. The invention enables on-vehicle and remote tasks which demand quality color images to be generated by all available camera sensors in vehicle, including the cameras with non-trichromatic CFAs. In some embodiments, the processing for colorization may utilize a Convolutional Neural Network (CNN) which has been adapted and trained using colored CFA camera images and non-trichromatic images. Non-CNN-based colorization algorithms may also be used as described herein.

In one aspect of the invention, apparatus for a motor vehicle comprises an image sensor generating non-trichromatic image data as an image pixel array covering a predetermined field of view relative to the vehicle. A color-calibration source generates at least one color reference value according to an object depicted in the non-trichromatic image data. A controller is configured to 1) associate the at least one color reference value to a set of pixels within the image pixel array, and 2) colorize the non-trichromatic image data according to the at least one color reference value to produce a colorized image. A display is configured to display the colorized image to a viewer in the vehicle.

DETAILED DESCRIPTION OF PREFERRED EMBODIMENTS

Figure 1:
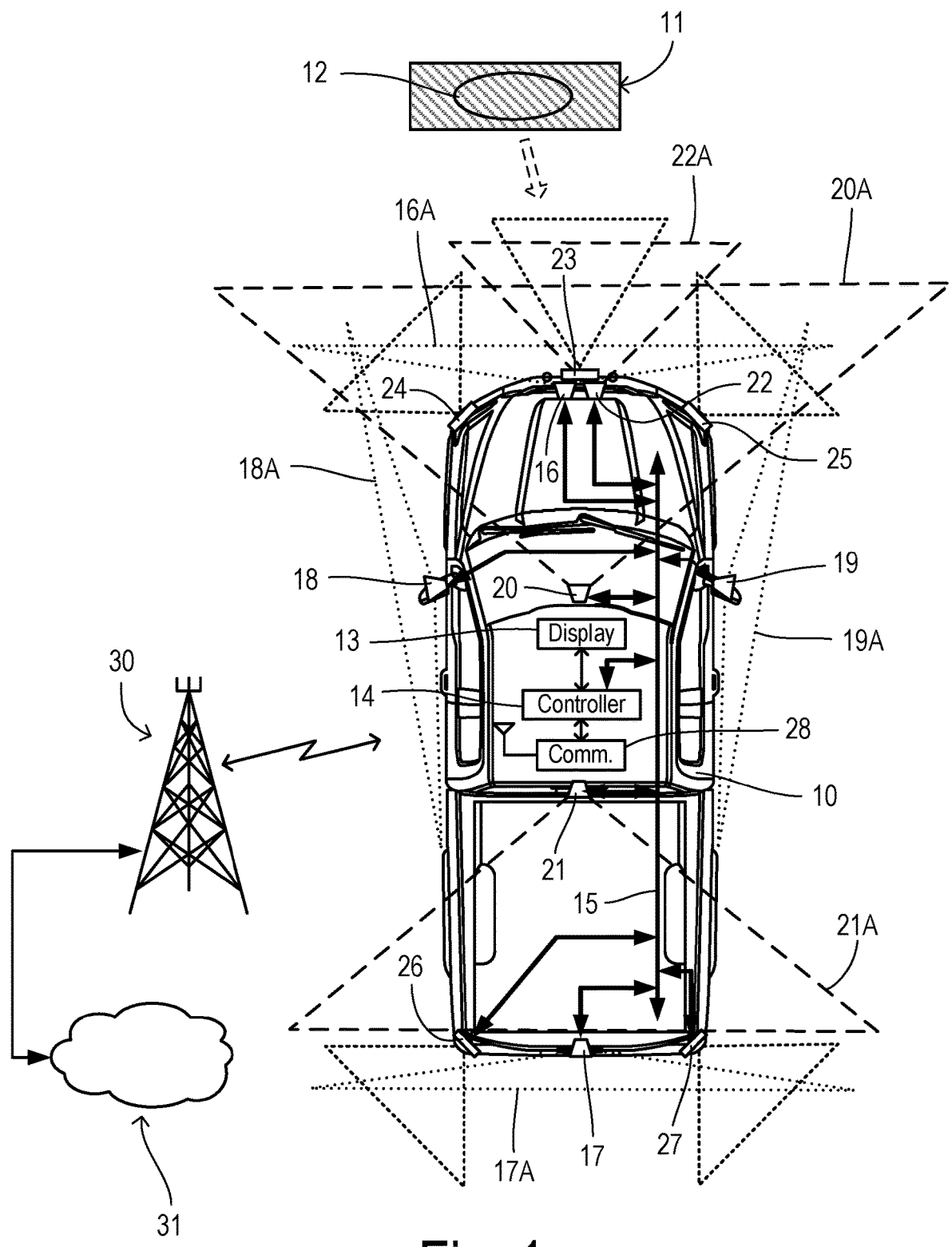
FIG. 1 is a diagram showing apparatus for a vehicle imaging and processing system.

Referring to FIG. 1, a vehicle 10 includes a plurality of remote-sensing devices (e.g., passive sensors such as optical image sensors, and active sensors such as radar and sonar) for monitoring the surroundings. In response to the surrounding scene, various images may be captured such as an image 11 to be displayed to a driver or other occupants of the vehicle using a display panel 13. Image 11 may include an object of interest 12 having an edge boundary enclosing a portion of the object which would be seen to reflect light of a characteristic color. A controller 14 drives images to be produced on display 13 based on image data collected from the image sensors over a communication bus 15 (e.g., a CAN bus). In addition to a live feed of selected camera views on display 13, images may be recorded (i.e., stored) automatically or in response to a user request. For example, a driver or passenger may choose to record an image of an interesting landmark, scenery, or event for later viewing. In the case of automatic image recording, the images may be used for accident reconstruction or other purposes. Whether as a live feed or a recorded image, images captured from an image sensor without full, tri-color capability might be desired because of the available resolution, field of view, or other factors.

The optical image sensors may include fisheye (i.e., wide-angle) cameras providing full color images to be displayed to the driver to assist in parking, backing-up, and other maneuvers. For example, vehicle 10 has a front fisheye camera 16, a rear fisheye camera 17, and side-view mirror fisheye cameras 18 and 19. The fisheye cameras each has a relatively wide field of view (FOV) such as FOVs 16A, 17A, 18A, and 19A. The resulting full-color images are geometrically distorted. Furthermore, the image resolution may be relatively low because of the large FOV and because a high resolution may not be necessary to achieve the intended purpose of the images presented to the driver on display 13. To support computer vision functions with higher resolution and absence of geometric distortion, a suite of non-trichromatic (i.e., lacking RGB color-filter arrays, such as monochrome or Red-clear) image sensors is provided on vehicle 10 including a windshield-mounted front camera 20 and a rear window-mounted back camera 21. A front grille camera 22 can be used instead of, or in addition to, front camera 20. These cameras provide narrower FOVs 20A, 21A, and 22A, respectively.

Some embodiments of the invention may utilize data about nearby objects which is detected using other kinds of remote sensing. Thus, radar transceivers 23-27 are deployed around the perimeter of vehicle 10 in a known manner.

Some embodiments of the invention may utilize off-board data sources and/or share image data with remote entities. Controller 14 may interact with remote assets by wireless communication using a communication module 28 in vehicle 10 which exchanges wireless signals with a cellular network 30 acting as a gateway to a cloud server 31.

Figure 2:
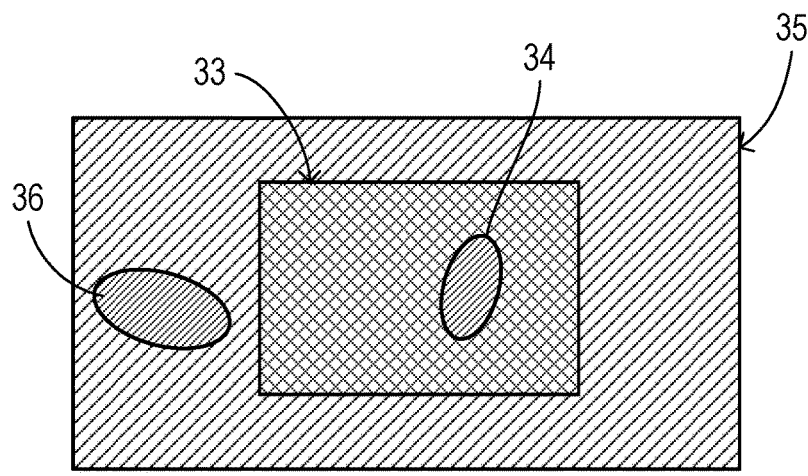
FIG. 2 depicts overlapping fields of view for a pair of image sensors.

FIG. 2 depicts a field of view 33 for a non-trichromatic image of which at least a portion (e.g., an object 34) is to be colorized using color reference data obtained from a source other than the non-trichromatic image itself. In some embodiments, the color reference data can be derived from a second image captured by a different image sensor deployed on the vehicle. In particular, the second image could be obtained from an image sensor having an FOV 35 which overlaps with FOV 33, so that the color reference data derived from the second image can be captured substantially simultaneously with the non-trichromatic image to be colorized (i.e., object 34 appears in both images at portions of the images that can be identified according to a pixel-to-pixel mapping as described below). In other embodiments, a non-simultaneous image can be employed by tracking movement of the object (e.g., as captured in full color as object 36 in an earlier or later obtained image when the object was within FOV 35 but not within FOV 33. When object tracking is employed, overlapping of FOV 33 and FOV 35 would not be required.

Figure 3:
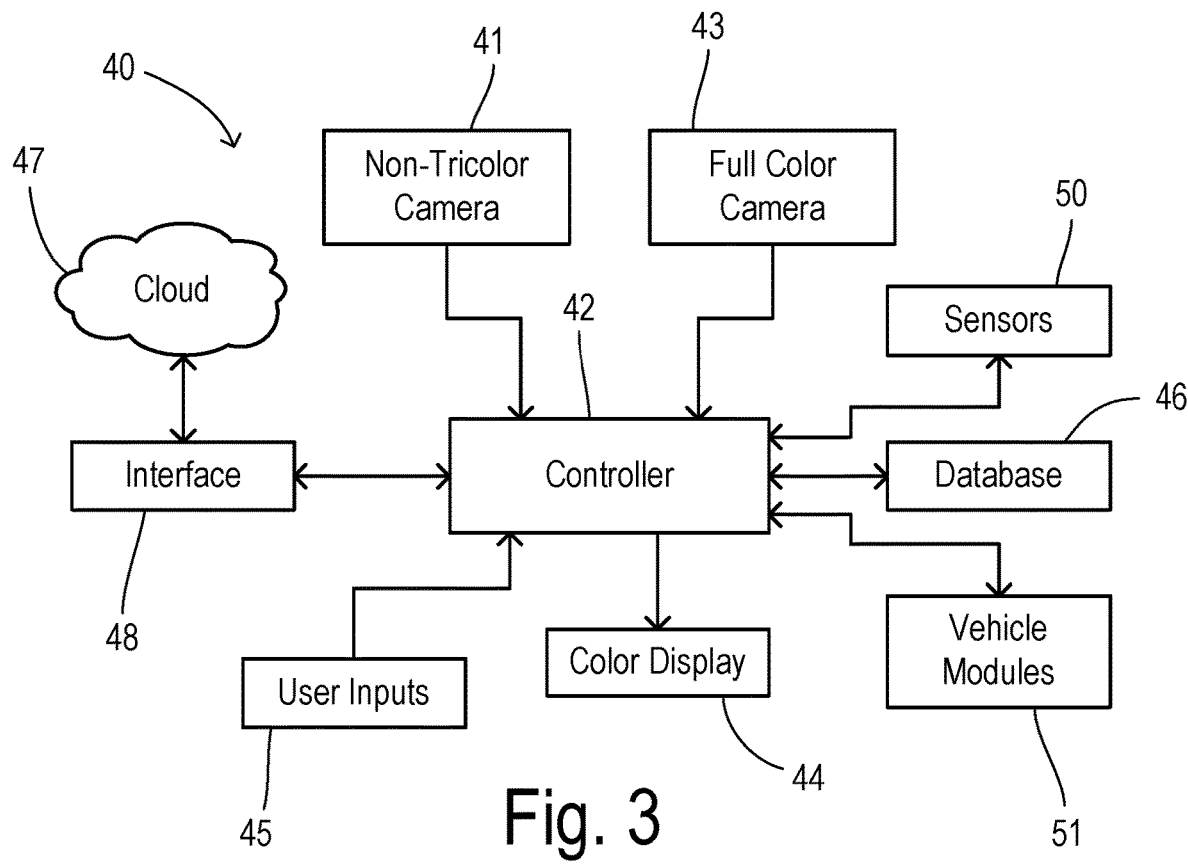
FIG. 3 is a block diagram for one preferred embodiment of a vehicle imaging and processing system.

FIG. 3 shows one preferred embodiment of apparatus 40 for capturing images and performing colorization of at least part of an image using extrinsic color reference data. A non-trichromatic camera 41 mounted on a vehicle captures an image lacking realistic color representation and provides the captured image to a controller 42. As one potential source of color reference data, a full color camera 43 captures realistic color images which are also provided to controller 42. Typically, camera 43 is also mounted on the vehicle, but could alternatively be an off-board camera having a field of view that captures the object to be colorized at the same time or at a different time. Using the extrinsic color reference data, controller 42 colorizes the object and may display a resulting colorized image on a color display 44. In some embodiments, selection of an object to be colorized can be performed manually with user inputs 45 (e.g., a touchscreen on which a user selects an object and initiates the colorization process).

Extrinsic color reference values could also be retrieved from a database 46 according to an identify of the object. For example, an object for colorization could be the hood of a vehicle, and database 46 could store a color value for the known color of paint applied to the hood. Alternatively, the identity of a specific landmark (e.g., a statue, building, monument, etc.) or a type of object (e.g., traffic sign) can be detected using sensors 50 (e.g., radar) and/or other vehicle modules (e.g., a GPS navigation module), and then correlated to a color reference value using database 46. A database containing color reference values for landmarks or types of objects could alternatively be stored in a cloud server 47 accessible to controller 42 via a wireless interface 48. Colorized images and/or image data to be used for off-board colorization can be sent to cloud server 47 or other remote locations for use by third parties.

Figure 4:
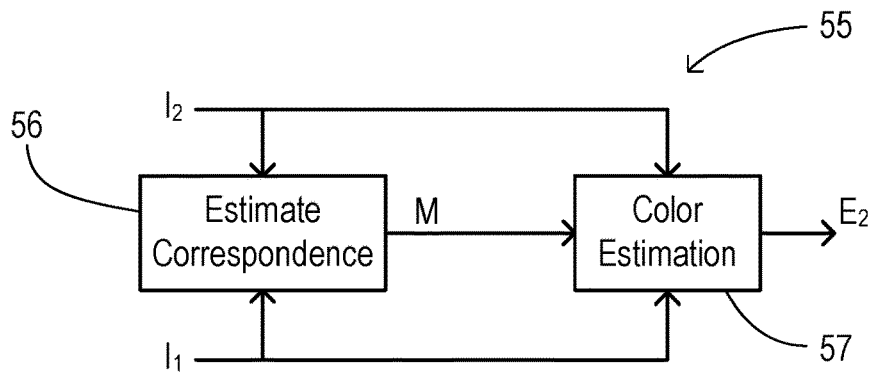
FIG. 4 is a block diagram according to one embodiment for mapping a color correspondence between images and for colorizing an image.

A preferred methodology for identifying relevant color reference values and then using the color reference values to colorize a target image involves estimating a correspondence between image pixels in the non-trichromatic image and the color reference data (e.g., image pixels representing the same object in a full color image). The correspondence can be determined 1) in real time from overlapping images, 2) in real time based on object tracking within images obtained substantially simultaneously or in advance, and/or 3) using pattern recognition to classify types of objects possessing predetermined color reference values. The function of estimating correspondence between i) an image object to be colorized and ii) an image pixel or reference item providing a color reference value and the function of performing the colorization itself can be implemented using a trained convolutional neural network (CNN) or using computational models. A first model is shown in FIG. 4, wherein a controller 55 includes a correspondence estimation block 56 and a color estimation block 57. $I_1$ and $I_2$ represent captured image data streams from image sensors with different CFA patterns (i.e., a trichromatic pattern and a non-trichromatic pattern). The images are captured from separate camera positions which are described by the camera origins and rotations of the camera 3D axes (extrinsic calibration) resulting from their mounting locations on the vehicle. A mapping, M, determined in correspondence block 56 describes the pixel correspondence between two images from $I_1$ and $I_2$. The pixel-to-pixel mapping is a function of taking the input pixel positions in one image and outputting pixel positions in the second image that match the same regions of the objects in the FOVs. Color estimation block 57 approximates an output color given the input colors from the two cameras and the correspondence mapping between images. An output image $E_2$ represents an estimated output color image.

Figure 5:
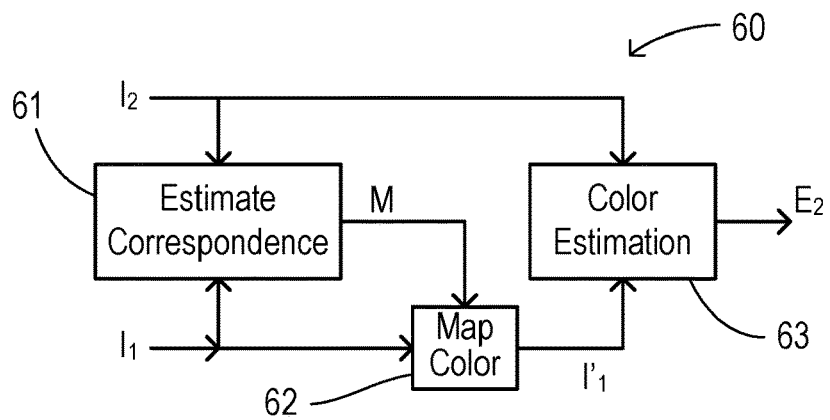
FIG. 5 is a block diagram according to another embodiment for mapping a color correspondence between images and for colorizing an image.

In an alternative embodiment shown in FIG. 5 having a controller 60, a correspondence mapping M from a correspondence estimation block 61 is applied to image $I_1$ in a color mapping block 62 to create an estimated image $I_1'$. The estimated image maintains the pixel color characteristics of image $I_1$ but with the spatial image characteristics of image $I_2$. Estimated image $I_1'$ and image $I_2$ are combined in color estimation block 63 to produce an output image $E_2$.

Figure 6:
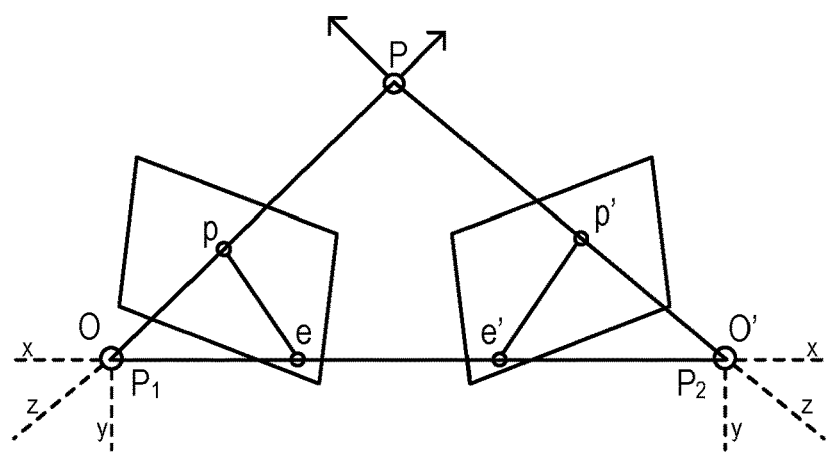
FIG. 6 illustrates geometrical relationships for performing a pixel mapping between images.

One method of estimating the correspondence between images $I_1$ and $I_2$ is to perform depth estimation by treating $I_1$ and $I_2$ as stereo image pairs as shown in FIG. 6. Typically lens distortion correction is applied to the images $I_1$ and $I_2$, and camera poses $P_1$ and $P_2$ (e.g., fields of view) are known. These are known as extrinsic camera calibration information. The poses consist of the camera projection origin and rotations of the camera coordinate frame. The camera intrinsic and extrinsic information define an epipolar geometry between the camera image planes, which defines the locus of points in a second image that correspond to a pixel in a first image. The epipolar geometry and epipolar lines are typically used to restrict the search region to determine corresponding points based on neighborhood similarity measures. The correspondence between images is based on identifying which pixels on or near the epipolar lines that are most similar to input pixels in the first image.

Imprecision in the estimated epipolar geometry can occur if errors exist in the intrinsic or extrinsic calibrations. These errors can be compensated by expanding the search region by relaxing the epipolar constraint to allow matches that fall near the epipolar lines.

As shown in FIG. 6, a point P projects onto the two camera sensor planes at points p and p'. The epipoles e and e' are the points in the camera image planes that intersect the line connecting the origins O and O'. The epipolar lines describe the locus in the image plane along which a scene point P will be imaged. For example, if scene point P moves radially toward origin O, then in the second image plane the corresponding point p' will lie on a line through the epipole e' in the second image plane. The benefit of knowing the epipolar geometry for an image sensor pair is that the search zone for corresponding points is constrained to the epipolar lines, and this is known as the epipolar constraint. The corresponding points can be represented as disparities that indicate the shifts between images for corresponding points. The disparities represent the mapping between images, where the mapping depends on the camera poses and depth to each scene point.

Estimating disparities between images is one method of establishing the correspondence between image pairs. The disparity estimates can be converted to scene depth estimates from the camera geometry through triangulation. Many techniques exist for disparity and depth estimation including applying convolutional neural networks, exploiting the epipolar constraint, hierarchical search, and plane-sweeping. Each of these methods will estimate the disparity between corresponding pixels. Additional techniques can be used to reduce noise or errors in the disparity estimates such as applying smoothness constraints or edge-preserving filtering.

Other techniques can be applied to estimate corresponding points by using additional constraints. For example, projective geometry determines that points on a planar surface are projected onto two planar image sensors such that a 3×3 transform called an image homography defines corresponding points. The 3×3 transform is applied to image coordinates in a homogeneous representation, where 2D image positions are augmented by a value of 1 to allow also representing offsets within a matrix multiplication operation. For scene points in the ground plane or on other planar surfaces, the homography determines an accurate correspondence with less computation than matching-based disparity estimation techniques.

The output estimated color image may be created to have accurate object color and to have minimal spatial artifacts. Color accuracy can be defined as matching the color appearance for a human observer of the captured scene (see, e.g., Fairchild, "Color Appearance Models", Wiley, 3rd edition, 2013). The output color image can be in a standardized color space such as sRGB, ITU-R BT.709 RGB, ITU-R BT.709 YCbCr, or CIE XYZ. The output color image can also be in a device color space such as corresponding to a specific set of display RGB primaries or image sensor RGB color sensitivities. In the case of device RGB color primaries, the device RGB color values can be computed as an optimal rendering of a set of target CIE XYZ values. In the case of sensor device RGB color values, conversion to a standard color space can be subsequent to estimating the sensor device RGB image.

Non-desirable spatial artifacts in the estimated, output color image include jagged edges, misaligned or doubled object edges, blurred edges or texture, or amplified noise. Such artifacts can occur in many different image fusion techniques that are based on fusing images from either the same image sensor or multiple instances of the same image sensor type. Examples of image fusion from common image sensor types include high-dynamic range image generation, panoramic image stitching, or surround view image generation.

An output color image from the color estimation block can be generated by applying weighted regression between the corresponding image pixel values. The weighted regression can be based on estimating the color accurate output colors given the specific device color imager spectral sensitivities and color calibration of the image sensors.

An output color image can be generated by applying an image processing algorithm that accepts as input spatial windows of corresponding image pixel values. Use of spatial windows allows imposing spatial smoothness constraints on the output image in order to reduce noise and enhance edges in the output image. For example, an image processing algorithm can compute image gradients in one or both of the input images and use the gradient information to estimate edge, texture, and smooth image regions. Separate techniques for estimating the output image values can be applied based on the estimated edge, texture or smooth image regions. For example, near the edges, the corresponding input pixel values can be combined so as to avoid blurring the edge or introducing edge discontinuities or doubled edges. In smooth image areas, the estimation technique can combine pixel values across the spatial neighborhood to reduce output image noise by adjusting the weighted contribution of pixels from the input pixel neighborhood(s). An algorithm for combining from disparate, corresponding input image CFAs can incorporate principles from advanced single-image noise reduction techniques such as bilateral filtering and median filtering.

Figure 7:
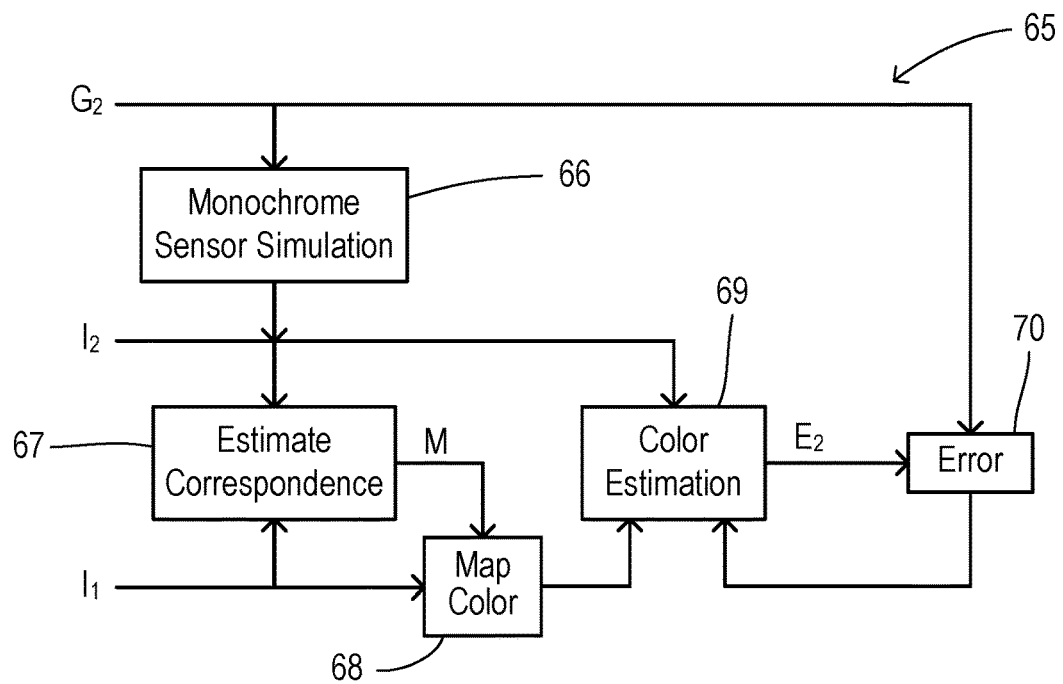
FIG. 7 is a block diagram according to an embodiment for adapting a neural network for colorizing images.

FIG. 7 shows a controller process for training a convolutional neural network to perform the estimation given values for $I_1$, $I_2$, and M or given values for $I_2$ and $I_1'$. Supervised training would use a ground truth color image ($G_2$) that is captured at nearly the same camera pose as the output reference image sensor $I_2$. Color image $G_2$ may be converted to monochrome image data by a simulator 66 to simulate the image from a non-trichromatic sensor. The ground truth training set may consist of images $I_1$, $I_2$, and $G_2$ which are applied to correspondence estimate block 67, color mapping block 68, and color estimation block 69 to produce an output colorized image $E_2$. An error image is computed between $G_2$ and $E_2$ in an error block 70, and back propagation is applied to train the CNN to best approximate $G_2$ given the inputs $I_1$, $I_2$, and M or given values for $I_2$ and $I_2'$.

Additional algorithms that could alternatively provide a basis for a color estimation block include Zhang et al [R. Zhang, J. Y. Zhu, P. Isola, X. Geng, A. S. Lin, T. Yu, A. A. Efros, Real-Time User-Guided Image Colorization with Learned Deep Priors, SIGGRAPH, 2017] which describes a convolutional neural network trained to predict the CIE a*b* channels corresponding to the grayscale input image. The network is trained using original RGB images as ground truth, where the RGB is converted to grayscale for input to the CNN. The CNN is trained by back-propagation to predict an a*b* distribution for the input grayscale image. The predicted a*b* values are combined with the input image lightness, L*, to create an output CIE Lab image (which can be converted to CIE XYZ or device independent RGB or YCbCr). This type of gray to color algorithm is able to "learn" from texture and object cues to predict the object color and to effectively spread these to object boundaries. Predicted colors for man-made objects are typically ambiguous, however, and without the added color reference values provided by the present invention the algorithm would generate incorrect predictions. Another CNN based colorization method that could be modified to incorporate the color reference data of this invention is described in S. Iizuka, E. Simo-Serra, and H. Ishikawa, Let there be Color!: Joint End-to-end Learning of Global and Local Image Priors for Automatic Image Colorization with Simultaneous Classification, SIGGRAPH, 2016. This CNN-based colorization method computes low-level, mid-level, and global features which are then combined within a fusion and colorization network. The colorization network estimates the chrominance information that is combined with the original luminance information to create the output image.

A user-guided approach to image colorization has been demonstrated in which a user manually selects color choices to be applied to monochrome images. For example, Levin et al [Anat Levin, Dani Lischinski, Yair Weiss, "Colorization using optimization", ACM Transaction on Graphics, 23(3): 689-694, 2004] describe a "Stroke Based" method of computer-assisted colorization of monochrome images. An artist annotates an input monochrome image with a few colored strokes. The algorithm estimates a pixel colorization based on color similarity to neighboring pixels, motion compensated location from previously-labeled frames, and luminance similarity. Instead of an artist's stroke, the present invention modifies the colorization process to utilize color reference data identified in real time on the vehicle. Thus, the invention automates the assignment of object colors from the additional RGB information on a per-object level. The additional RGB information can be in the form of the CIE a*b* color distribution as well as on an individual object basis.

The on-vehicle color reference values and correspondence mapping of the invention can also be utilized to modify an automated CNN colorization method as described in Larsson et al [G. Larsson, M. Maire, and G. Shakhnarovich, Learning Representations for Automatic Colorization, ECCV, 2016]. In that method, a VGG architecture is pre-trained utilizing images from ImageNet. The architecture is a hyper column of feature responses across resolution levels created as a descriptor of the local image structure and texture. The CNN is trained to map from the hyper column features to predicted hue and Chroma values. The training utilizes a cost function based on the 2D hue-chroma histogram similarity within a spatial neighborhood. Several different cost functions are described based on different weightings of hue and chroma and weightings for spatial proximity between the target and source histograms.

Further, the on-vehicle color reference values and correspondence mapping of the invention can also be utilized to modify a grayscale colorization method disclosed by Welsh et al [T. Welsh, M. Ashikhmin, K. Mueller, Transferring Color to Greyscale Images, SIGGRAPH '02: Proceedings of the 29th Annual Conference on Computer Graphics and Interactive Techniques, pages 277-280, 2002]. In that method, corresponding pixels are identified between an input grayscale image and an RGB image of a different scene. Correspondence is based on luminance and texture similarity after searching approximately 200 gridded locations within the RGB image for 5×5 windows. Color is transferred as (a,b) values in an Lab color-space using a texture synthesis method.

The invention may utilize a collection of surround vehicle images to be combined at pixel level to enhance surround video experience. More than one sensing modality may be used (visible spectrum, SWIR, LIDAR, ultrasonic, light sensor, GPS) to assist the vehicle algorithm to align image data at pixel level. The vehicle algorithm could also perform 1) geometric evaluation (signs, traffic signals, curbs, walls, etc.), 2) object detection and comparison to cloud data, and 3) time of day estimation (e.g., comparison between real-time data and cloud data containing corresponding objects to the ones imaged by the vehicle image sensors for the purpose of adjusting image appearance according to lighting conditions). The analysis of camera video can be shared over a CAN bus, Ethernet, and/or wireless or other communication method where inputs from other sensors (e.g., suspension, steering, weather forecasts) can be used to refine the estimates of the pixel-to-pixel correspondence for the image colorization algorithm. For example, after the vehicle collects images and other sensor data from the surrounding environment, in conjunction with available vehicle data, the controller may analyze the data and broadcast a pixel-to-pixel overlay. If available, the vehicle could compare results against information from remote data centers and/or obtain real-time feedback from available images using V2X communication, thereby enabling the vehicle controller to analyze the data and identify the pixel-to-pixel color points.

Figure 8:
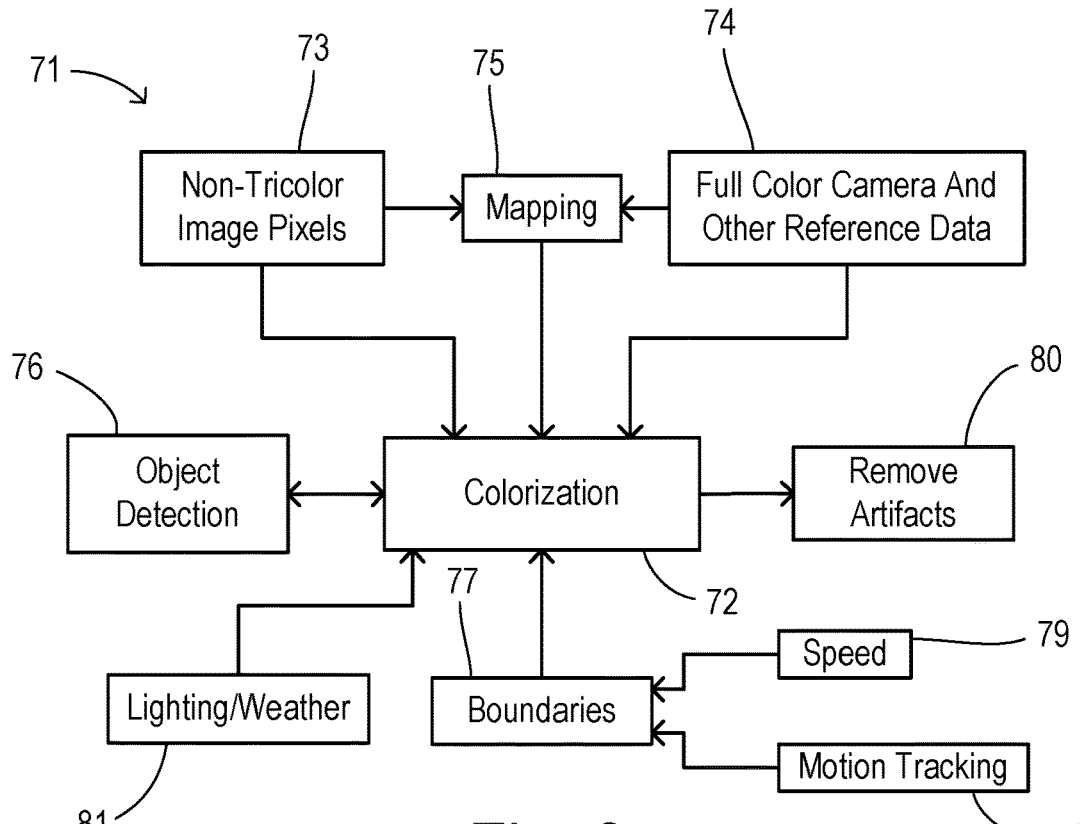
FIG. 8 is a block diagram showing processing functions for colorizing images.

FIG. 8 shows a vehicle controller apparatus 71 with computational blocks supporting a main colorization block 72. As explained above, colorization of non-tricolor image data in a block 73 can be performed using full color reference values from a color-calibration source in block 74 (e.g., containing trichromatic image data from a vehicle-mounted trichromatic image sensor or other reference data) using a pixel-to-pixel correspondence from a mapping block 75. Instead of a pixel-to-pixel mapping of two static images, the color reference values can be mapped to an object of interest as detected using an object detection block 76. The detected object may be tracked using a boundary tracking block 77 which may utilize a motion tracking process 78 (e.g., using vehicle stability sensing, vehicle location data, and other known techniques) and vehicle speed data 79. An artifact removal block 80 may be provided for removing jagged or double edges, which may utilize inputs from boundary tracking block 77 for example. Colorization can be further improved using lighting and/or weather data in a block 81.

Figure 9:
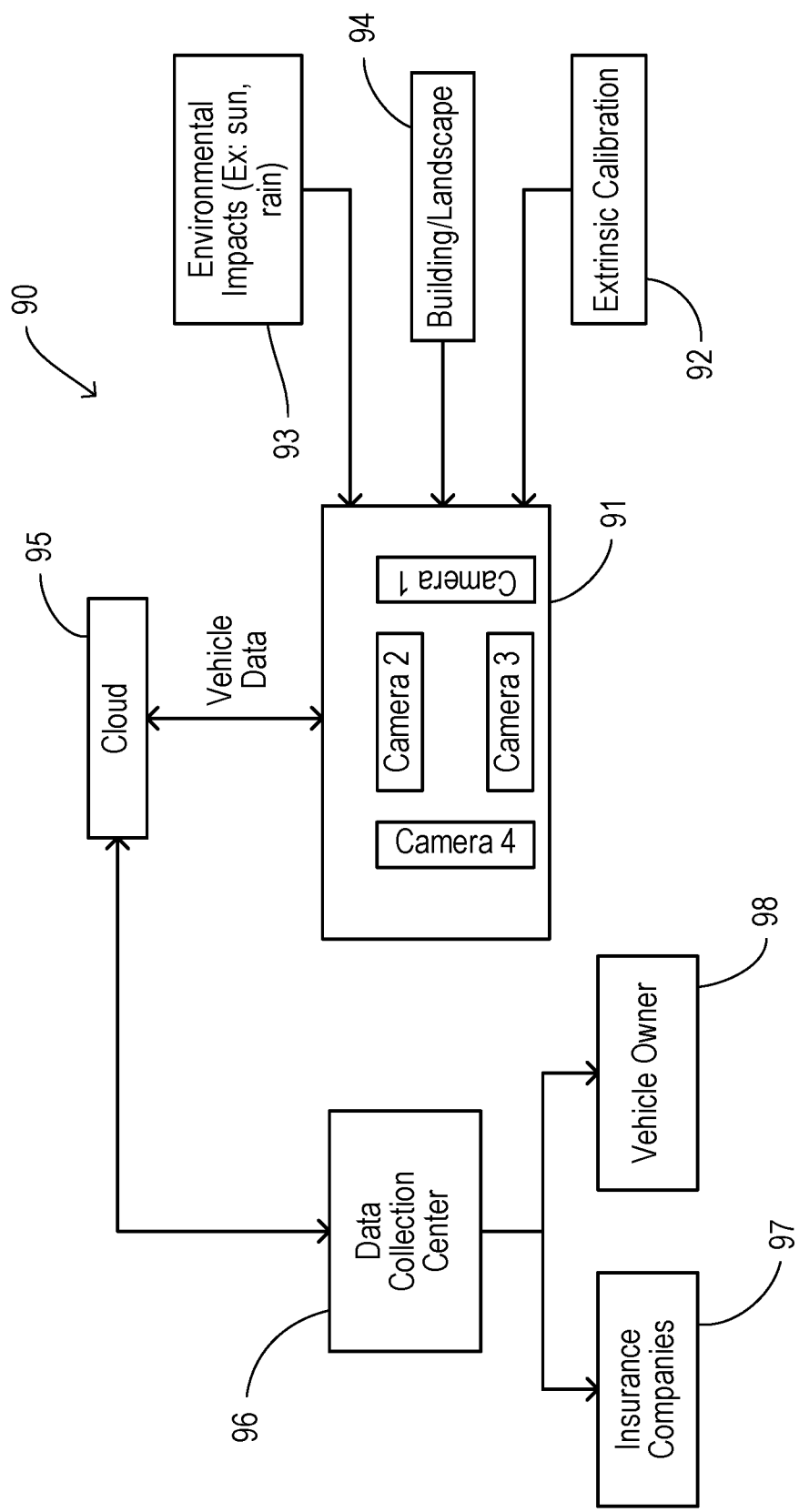
FIG. 9 is a block diagram showing another embodiment of vehicle apparatus for creating and distributing colorized images.

An embodiment of an apparatus 90 providing additional features involving remote assets is shown in FIG. 9. A vehicle 91 includes a camera system having non-trichromatic and trichromatic image sensors each having a respective pose and providing images for specific purposes. The invention performs image fusion in order to colorize non-trichromatic image data using various factors such as extrinsic calibration data 92, environmental impact data 93, and geometric surrounding (e.g., building and landscape) data 94. Using a wireless communication channel to a cloud 95, vehicle data including colorized images or raw images together with data related to color reference values are transmitted to/from a data collection center 96. From data collection center 96, colorized images can be shared electronically with a vehicle owner/user 98 or with third parties such as insurance companies 97.

The foregoing invention provides significant advantages over prior vehicle imaging systems. In particular, a vehicle-level system provides the necessary input information to allow a high quality image colorization. Color-accurate/real-time pixel to pixel input colorization is obtained with improved color accuracy which is not labor intensive, user-driven, or dependent upon fabricated color choices. For example, when utilizing a front windshield ADAS camera with the ability to see the color of the vehicle hood, the corresponding known color information can be utilized to color the appropriate pixels. If seen in the particular fields of view, the known colors of other interior or exterior regions would be additional color reference data points.

Data centers may receive real-time broadcast vehicle images or video and may also send any other past or present data to allow the vehicle systems to compare image changes against real-time information. The colorization method may be applied on-vehicle or using summarized information sent by the vehicle to reduce vehicle to data center communication bandwidth. For example, the non-trichromatic image data may be transmitted along with summary color information for scene objects that are computed from the RGB image sensor (rather than sending the entire RGB-reference image). Once all data is compiled, the vehicle algorithm can confirm image colorization and broadcast a colorized version. Alternatively, the transmitted information can be used to perform the colorization off-line and off-vehicle.

Vehicle motion may be used to enhance correspondences between successive frames in order to generate consistent colorizations across time. In this case the use of multiple temporally separated frames can aid scene depth estimation using optical flow and structure from motion techniques. Correspondences predicted from optical flow can be used to propagate colorizations from previous time steps and allow temporal smoothing or consistency to be generated for the current frame colorization.

GPS and other localization data can be used to correlate stored color information for a scene, road, and landmarks that may be used to enhance the color accuracy of the colorization output. For example, stored landmark color information may reduce error in the estimated color or improve white balance estimation and white balance correction methods.

In addition, the color reference data for identified objects could provide opportunities for interpolation of color choices for other regions of the non-trichromatic image which have similar image properties to the original object.

What is claimed is:

1. Apparatus for a motor vehicle comprising:
   an image sensor generating non-trichromatic image data as an image pixel array covering a predetermined field of view relative to the vehicle;
   a color-calibration source generating at least one color reference value according to an object depicted in the non-trichromatic image data comprising a region within a discernible border with a characteristic color appearance;
   a controller configured to 1) associate the at least one color reference value to a set of pixels within the image pixel array corresponding to the object, and 2) colorize the non-trichromatic image data according to the at least one color reference value to produce a colorized image; and
   a display configured to display the colorized image to a viewer in the vehicle.

2. The apparatus of claim 1 wherein the non-trichromatic image data is collected for a driver assistance system employing computer vision.

3. The apparatus of claim 1 wherein the color-calibration source is comprised of a trichromatic image sensor mounted to the vehicle and capturing at least one reference image for determining the color reference value.

4. The apparatus of claim 1 wherein the controller is configured to determine an identification of the object, and wherein the color-calibration source is comprised of a database correlating the identification to the color reference value.

5. The apparatus of claim 4 wherein the identification is comprised of an object type.

6. The apparatus of claim 4 wherein the identification is comprised of a landmark identifier determined according to a geographic location of the vehicle, and wherein the database comprises color reference values predetermined for a plurality of landmarks.

7. The apparatus of claim 1 further comprising an environmental data collector providing an environmental parameter, wherein the controller colorizes the non-trichromatic image data according to the environmental parameter.

8. A method for colorizing a non-trichromatic image obtained from a motor vehicle, comprising the steps of:
   capturing a target image using an image sensor generating non-trichromatic image data as an image pixel array covering a predetermined field of view relative to the vehicle;
   generating at least one color reference value in a color-calibration source according to an object depicted in the non-trichromatic image data comprising a region within a discernible border with a characteristic color appearance;

associating the at least one color reference value to a set of pixels within the image pixel array corresponding to the object;

colorizing the non-trichromatic image data according to the at least one color reference value to produce a colorized image; and displaying the colorized image to a viewer in the vehicle.

9. The method of claim 8 wherein the non-trichromatic image data is input to a driver assistance system employing computer vision to detect objects in a vicinity of the vehicle.

10. The method of claim 8 wherein the color-calibration source is comprised of a trichromatic image sensor mounted to the vehicle, and wherein the step of generating at least one color reference value is comprised of capturing at least one reference image.

11. The method of claim 10 further comprising the step of constructing a mapping which identifies a portion of the reference image matching the object depicted in the non-trichromatic image data.

12. The method of claim 11 wherein the mapping is comprised of a pixel-to-pixel mapping, and wherein color data for pixels in the reference image provide the color reference values for mapped pixels of the non-trichromatic image data, including mapped pixels corresponding to the object.

13. The method of claim 11 wherein the predetermined field of view of the non-trichromatic image data at least partly overlaps with a field of view of the trichromatic image sensor, and wherein the mapping includes depth estimation of the non-trichromatic image data and the reference image.

14. The method of claim 11 wherein the mapping is comprised of detecting and tracking the object within the reference image and within the non-trichromatic image data.

15. The method of claim 8 wherein the color-calibration source is comprised of a database correlating a plurality of predetermined object identifiers with known color reference values, the method further comprising the steps of:

determining an object identifier for the object depicted in the non-trichromatic image data;

retrieving the color reference value from the database according to the determined object identifier.

16. The method of claim 8 further comprising the steps of:

determining an environmental parameter which impacts visual appearance of the object using an environmental data collector; and adjusting the colorization of the non-trichromatic image data according to the environmental parameter.

17. Apparatus for a motor vehicle comprising:

an image sensor generating non-trichromatic image data as an image pixel array covering a predetermined field of view relative to the vehicle;

a color-calibration source generating at least one color reference value according to an object depicted in the non-trichromatic image data, wherein the color-calibration source is comprised of a trichromatic image sensor mounted to the vehicle and capturing at least one reference image for determining the color reference value;

a controller configured to 1) construct a mapping which identifies a portion of the reference image matching the object depicted in the non-trichromatic image data in order to associate the at least one color reference value to a set of pixels within the image pixel array, and 2) colorize the non-trichromatic image data according to the at least one color reference value to produce a colorized image; and a display configured to display the colorized image to a viewer in the vehicle.

18. The apparatus of claim 17 wherein the mapping is comprised of a pixel-to-pixel mapping, and wherein color data for pixels in the reference image provide the color reference values for mapped pixels of the non-trichromatic image data, including mapped pixels corresponding to the object.

19. The apparatus of claim 17 wherein the predetermined field of view of the non-trichromatic image data at least partly overlaps with a field of view of the trichromatic image sensor, and wherein the mapping includes depth estimation of the non-trichromatic image data and the reference image.

20. The apparatus of claim 17 wherein the mapping is comprised of detecting and tracking the object within the reference image and within the non-trichromatic image data.

* * * * *